(12) United States Patent
Kobayashi

(10) Patent No.: US 11,388,154 B2
(45) Date of Patent: Jul. 12, 2022

(54) INFORMATION PROCESSING APPARATUS, SYSTEM, AND NON-TRANSITORY COMPUTER-READABLE STORAGE MEDIUM

(71) Applicant: CANON KABUSHIKI KAISHA, Tokyo (JP)

(72) Inventor: Makoto Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 256 days.

(21) Appl. No.: 16/683,664

(22) Filed: Nov. 14, 2019

(65) Prior Publication Data
US 2020/0162441 A1    May 21, 2020

(30) Foreign Application Priority Data
Nov. 21, 2018    (JP) .............................. JP2018-218488

(51) Int. Cl.
*H04L 9/40*    (2022.01)

(52) U.S. Cl.
CPC ........ *H04L 63/068* (2013.01); *H04L 63/0807* (2013.01); *H04L 63/205* (2013.01)

(58) Field of Classification Search
CPC .. H04L 63/068; H04L 63/0807; H04L 63/205
See application file for complete search history.

(56) References Cited

U.S. PATENT DOCUMENTS

| | | | |
|---|---|---|---|
| 9,887,992 B1* | 2/2018 | Venkat | G06F 21/35 |
| 10,387,639 B2* | 8/2019 | Jeon | H04L 9/0643 |
| 2014/0029603 A1* | 1/2014 | Nomura | H04W 56/0015 370/350 |
| 2015/0073571 A1* | 3/2015 | Basulto | G05B 19/05 700/86 |
| 2016/0259061 A1* | 9/2016 | Carter | G01S 19/05 |
| 2018/0109540 A1* | 4/2018 | Amar | G06F 21/6218 |
| 2019/0386981 A1* | 12/2019 | Ramesh Kumar | H04L 63/0853 |

FOREIGN PATENT DOCUMENTS

JP    2009069892 A    4/2009

* cited by examiner

*Primary Examiner* — William S Powers
(74) *Attorney, Agent, or Firm* — Rossi, Kimms & McDowell LLP

(57) ABSTRACT

An information processing apparatus, which is communicably connected to an authorization server and a resource server, includes an expiration time generated based on a time of the information processing apparatus in a request for a token for usage of a service provided by the resource server, and sends the request to the authorization server. When time information of the authorization server is received as a response to the request, the information processing apparatus includes an expiration time generated based on the time information of the authorization server in the request for the token, and resends the requests. The information processing apparatus then requests the resource server for time information of the resource server using the token obtained as a response to the resent request, and corrects the time of the information processing apparatus based on the time information of the resource server.

8 Claims, 9 Drawing Sheets

INFORMATION PROCESSING APPARATUS, SYSTEM, AND NON-TRANSITORY COMPUTER-READABLE STORAGE MEDIUM

BACKGROUND OF THE INVENTION

Field of the Invention

The present invention relates to an information processing apparatus, a system, and a non-transitory computer-readable storage medium.

Description of the Related Art

In a client terminal that cooperates with a resource server, a client application is provided with a configuration of recording various data (alert, configuration information, counter, job, sensor information, and the like) and sending the data to the resource server. In such a case, the various data is stored locally in the client terminal with a time stamp, and is sent to the resource server when the client application sends data. In addition, when obtaining an authorization token, the client terminal generates and sends an assertion which is required in an authorization sequence on the client terminal side. At that time, a token provider in the client terminal adds an expiration time to the assertion based on the device time (in other words, the time in the client terminal). The expiration time is generally set to a short time (for example, about 5 minutes later) as a countermeasure for a replay attack or the like. As an authorization sequence, there is a method that conforms to the authentication framework of OAuth 2.0, which uses a JWT (JSON Web Token) or the like.

As described above, at a time of cooperation between different apparatuses, there may be a difference between the time used on a client terminal side and the time used on a server side. Japanese Patent Laid-Open No. 2009-69892, for example, describes a method of correcting, in such a case, the time indicated by data received from a client terminal on a server side to the server's own time.

However, in the above method, there is a problem to be solved in that the required conditions for the time correction are different between when recording event logs by the client application and when obtaining a token, and there is a need to be able to perform two different methods of correcting the time on the same device.

For example, event logs must be recorded on a client application in association with the time, in order, without putting the various device event log times into the past. More specifically, when the order of events changes from "low toner" and then "toner empty" to "toner empty" and then "low toner", there is a possibility that toner delivery will occur twice in the worst case. Therefore, when the time used for event log recording is corrected, the time difference needs to be gradually reduced with respect to a correction target time, as in the slew mode of NTP (Network Time Protocol).

On the other hand, with respect to token obtainment, a value (for example, 5 minutes) having a short expiration time that is set in the assertion used for the token obtainment is set. Therefore, with respect to correction of a time used for token obtainment, if there is a deviation of 5 minutes or more from the target time (for example, the time on the server side) when an assertion is generated, it is necessary to instantaneously correct the target time. For example, if there is a time difference of 5 minutes or more from the time of a server that verifies an assertion generated by a device, it will be determined that the expiration time for the assertion has expired. When correcting the time of event log recording of a client application, first processing for obtaining a token that accompanies the use of an assertion is necessary.

SUMMARY OF THE INVENTION

In view of the above problems, in the present invention, when two different time corrections are required, time alignment is performed safely and reliably.

According to one aspect of the present invention, there is provided an information processing apparatus communicably connected to an authorization server and a resource server, the apparatus comprising: a requesting unit configured to include an expiration time generated based on a time of the information processing apparatus in a request for a token for usage of a service provided by the resource server, and send the request to the authorization server; a sending unit configured to, when time information of the authorization server is received as a response to the request by the requesting unit, include an expiration time generated based on the time information of the authorization server in the request for the token, and resend the request; a correction unit configured to request the resource server for time information of the resource server using the token obtained as a response to the request, and correct the time of the information processing apparatus based on the time information of the resource server.

According to another aspect of the present invention, there is provided a system in which an information processing apparatus, an authorization server, and a resource server are communicably connected, wherein the information processing apparatus comprises: a requesting unit configured to include an expiration time generated based on a time of the information processing apparatus in a request for a token for usage of a service provided by the resource server, and send the request to the authorization server; a sending unit configured to, when time information of the authorization server is received as a response to the request by the requesting unit, include an expiration time generated based on the time information of the authorization server in the request for the token, and resend the request; a correction unit configured to request the resource server for time information of the resource server using the token obtained as a response to the request, and correct the time of the information processing apparatus based on the time information of the resource server, and the authorization server comprises: a verification unit configured to, when a request for a token for using the service provided by the resource server is accepted from the information processing apparatus, verify the request; and an issuing unit configured to issue the token according to a result of verification by the verification unit, wherein, when it is determined by the verification unit that a setting of the expiration time of the request included in the request is not included in a range defined based on a time of the authorization server, the issuing unit sends time information of the authorization server to the information processing apparatus.

According to another aspect of the present invention, there is provided a non-transitory computer-readable medium storing a program for causing a computer to function as: a requesting unit configured to include an expiration time generated based on a time of the computer in a request for a token for usage of a service provided by the resource server, and send the request to an authorization server; a sending unit configured to, when time information of the authorization server is received as a response to the request by the requesting unit, include an expiration time generated based on the time information of the authorization server in the request for the token, and resend the request; a correction unit configured to request the resource server for time information of the resource server using the token obtained as a response to the request, and correct the time of the computer based on the time information of the resource server.

According to the present invention, when two different time corrections are required, it is possible to perform time alignment safely and reliably.

Further features of the present invention will become apparent from the following description of exemplary embodiments (with reference to the attached drawings).

DESCRIPTION OF THE EMBODIMENTS

Hereinafter, embodiments of the present invention will be described with reference to the drawings. The following embodiments are merely examples, and the present invention is not intended to be limited to these embodiments.

First Embodiment

[System Configuration]
In the present embodiment, a configuration in which an application is installed in various servers on the Internet will be described as an example. The application cooperates with the client terminal to provide various functions. An entity providing such a function is referred to as a "service", and the provision of the function to the client terminal is referred to as "provision of service".

Figure 1:
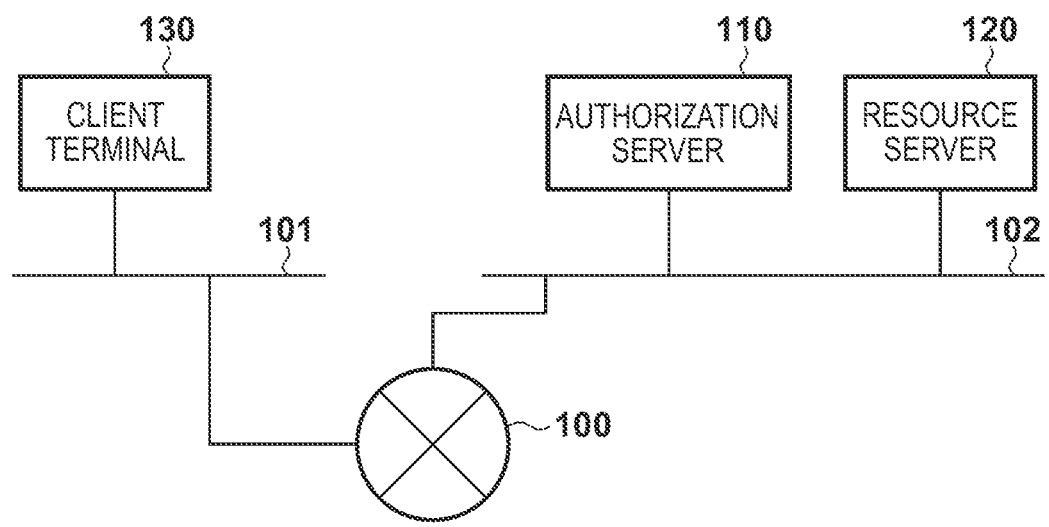
FIG. 1 is a diagram illustrating an example of a system configuration according to the present invention.

FIG. 1 illustrates an example of a network configuration of a data access management system which is an information processing system according to the present embodiment. Note that there is no particular limitation on a method of configuring the network, and the network may be wired or wireless and may be configured by combining a plurality of communication methods.

A WAN (Wide Area Network) 100 is configured by one or a plurality of networks, and in the present embodiment, a WWW (World Wide Web) system is constructed. LANs (Local Area Networks) 101 and 102 are networks for connecting respective components. An authorization server 110 is an authorization server for realizing authentication and authorization of a client terminal 130. A resource server 120 provides various services, such as a service for backing up data of the client terminal 130 and a service for analyzing sensor information of the client terminal 130. The client terminal 130 is a device that uses a service, and corresponds to, for example, a personal computer, a mobile terminal, an image forming apparatus, or the like.

The authorization server 110 authenticates the client terminal 130, receives an authorization token request from the client terminal 130, and issues an authorization token necessary for usage of the resource server 120. In the present embodiment, FIG. 1 illustrates an example in which each server is installed as a respective device, but for example, a plurality of servers may be used for load balancing, or the servers may be provided together as an authorization server system. The authorization server 110 and the resource server 120 may be connected to different networks. The apparatus are communicably connected to each other.

Figure 2:
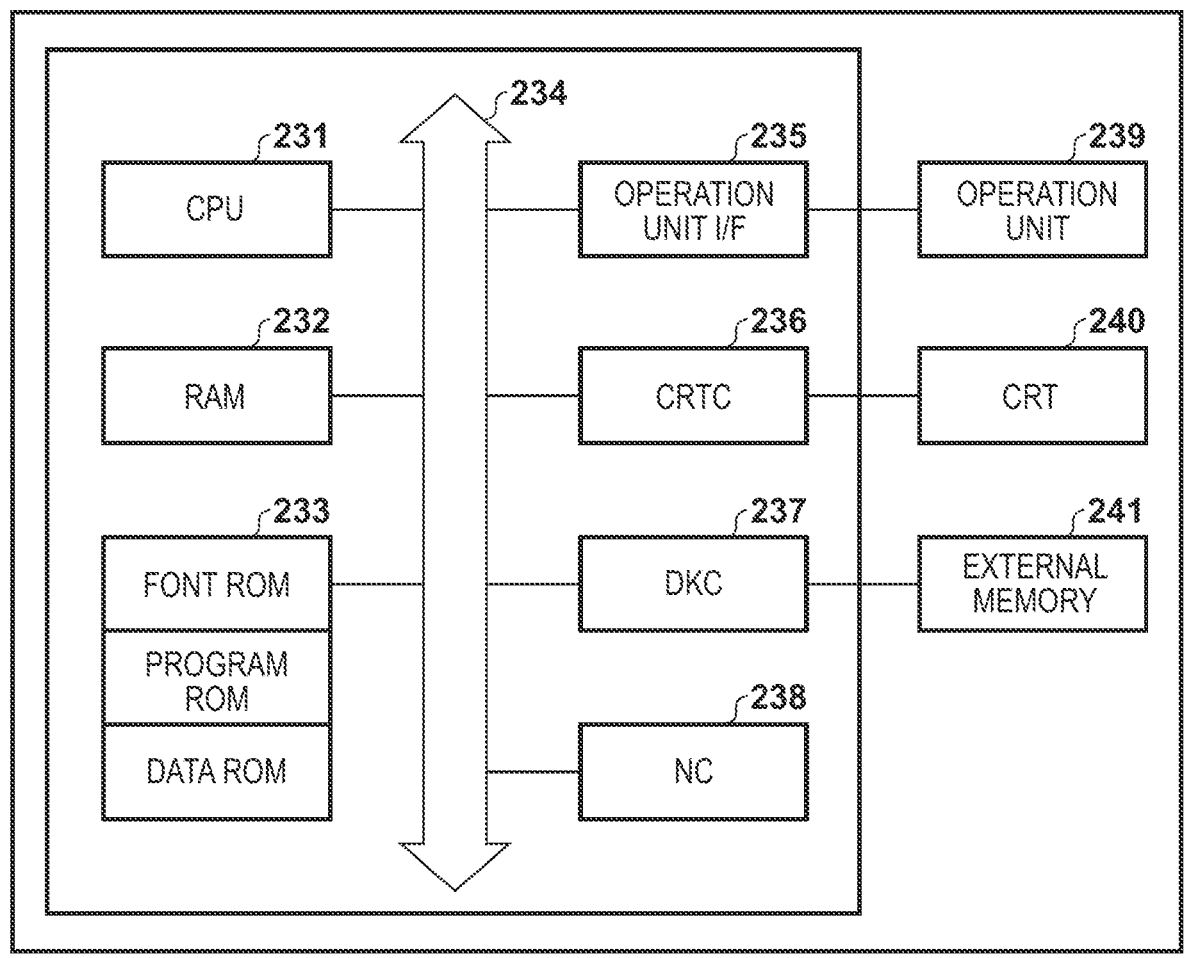
FIG. 2 is a diagram illustrating an example of a hardware configuration of each apparatus according to the present invention.

[Hardware Configuration]
FIG. 2 is a general hardware configuration of an information processing apparatus applicable to the authorization server 110, the resource server 120, and the client terminal 130 according to the present embodiment. Here, the description will be made on the assumption that all hardware configurations are the same, but different hardware configurations may be provided.

A CPU (Central Processing Unit) 231 executes programs such as an OS (Operating System) and an application stored in a program ROM of a ROM (Read Only Memory) 233 or an external memory 241. The CPU 231 controls the blocks connected to a system bus 234. The processes of the sequences to be described later can be realized by execution of programs by the CPU 231. A RAM (Random Access Memory) 232 functions as a main memory, a work area, and the like of the CPU 231. An operation unit IIF 235 is an interface (IX) for controlling inputs from an operation unit 239. A CRT controller (CRTC) 236 controls the display of the CRT display 240. A disk controller (DKC) 237 controls data access to an external memory 241 which is a hard disk (HD) or the like and stores various data. A network controller (NC) 238 executes a communication control process with a server computer or another device connected via the WAN 100 or the LANs 101 and 102.

Incidentally, in all descriptions given later, unless otherwise specified, the performer of execution on the hardware is the CPU 231, and the performer of software is an application program installed in the external memory 241.

Figure 3A:
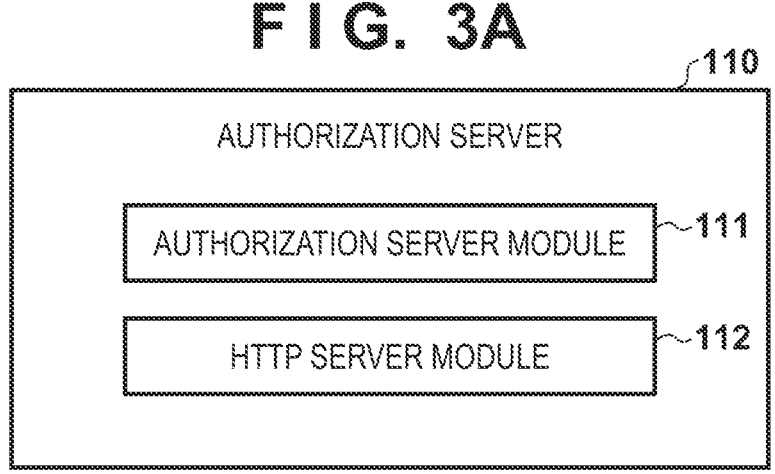
FIGS. 3A, 3B, and 3C are diagrams illustrating exemplary configurations of software modules of respective apparatuses according to the present invention.
Figure 3B:
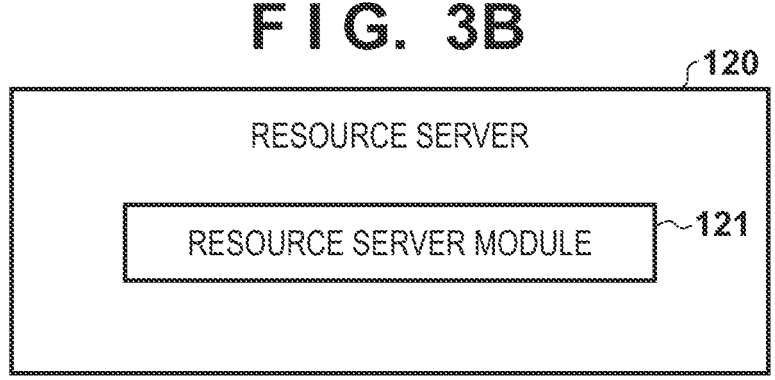
Figure 3C:
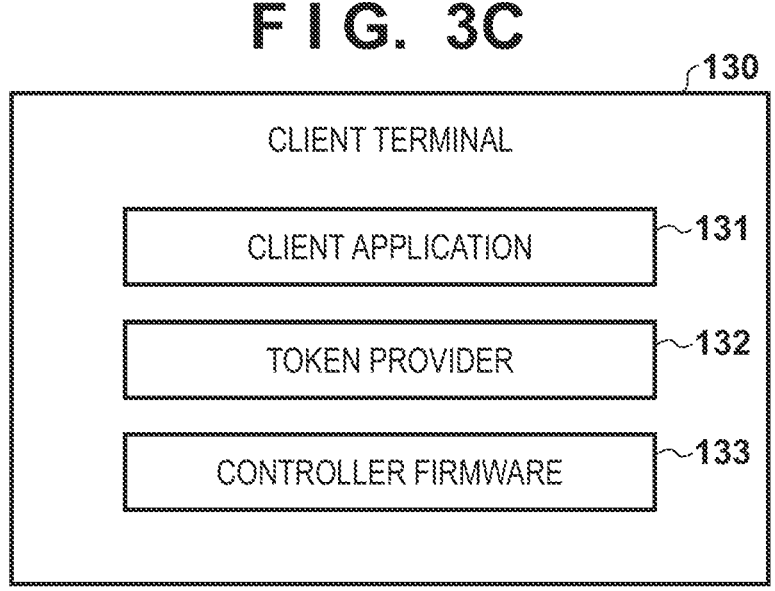

[Software Configuration]
FIGS. 3A to 3C are diagrams illustrating examples of the software configurations of the authorization server 110, the resource server 120, and the client terminal 130 according to the present embodiment. It should be noted that the software illustrated here illustrates only portions related to the present embodiment, and may further include other software modules.

The authorization server 110 is configured by including an authorization server module 111 and an HTTP server module 112. The HTTP server module 112 communicates with the client terminal 130 via the WAN 100, and performs HTTP communication with a client application 131 and a token provider 132 included in the client terminal 130. The HTTP server module 112 is capable of communication by SSL (Secure Sockets Layer)/TLS (Transport Layer Security), and includes a certificate store (not illustrated).

The authorization server module 111 receives a request from the client application 131 and the token provider 132 of the client terminal 130 via the HTTP server module 112, and responds with a result for the request. Specifically, when the authorization server module 111 receives a request for user authentication from the token provider 132, the authorization server module 111 generates an authorization token to which user information of a user who has been successfully authenticated is linked, and notifies the token provider 132 of the authorization token. The authorization token is a token for indicating that the user is logged in to the authorization server 110, or a token for verifying whether the user has been authenticated on the authorization server 110. The authorization server 110 can identify a user by using the authorization token. The authorization server module 111 may be configured to store a private key for assigning signature information to the authorization token. In this case, the authorization server module 111 assigns the signature information to the authorization token using the private key, and issues the authorization token with the signature information to the client terminal 130.

The resource server 120 is configured by including a resource server module 121. The resource server module 121 exposes an Application Programming Interface (API) for providing web services. Like the authorization server 110, the resource server 120 may include an HTTP server module, and may execute sending and receiving with the outside via the HTTP server module.

The client terminal 130 is configured by including the client application 131, the token provider 132, and controller firmware 133. The client application 131 obtains an authorization token from the authorization server 110 via the token provider 132. The client terminal 130 uses the obtained authorization token to use the API disclosed by the resource server 120.

The token provider 132 receives the authorization token request from the client application 131 and obtains an authorization token by communicating with the authorization server 110. In the following description, the "authorization token request" is a request sent from the client application 131 to the token provider 132 in order to obtain an authorization token. Meanwhile, a "token request" is a request that the token provider 132 sends to the authorization server 110 to obtain an authorization token. In this way, it should be noted that even with requests for obtaining the same authorization token, the names of the request differ when the sources and destinations of the request differ. Below, the authorization token is used as an access token for accessing the resource server.

The token provider 132 comprises, as a vendor default credential, a client certificate and its private key defined in the format of X.509 for certifying the validity of the token provider 132 itself. By the token provider 132 utilizing the client certificate and its private key at a time of establishing communication with the authorization server 110, the authorization server 110 can authenticate the token provider 132.

Figure 4:
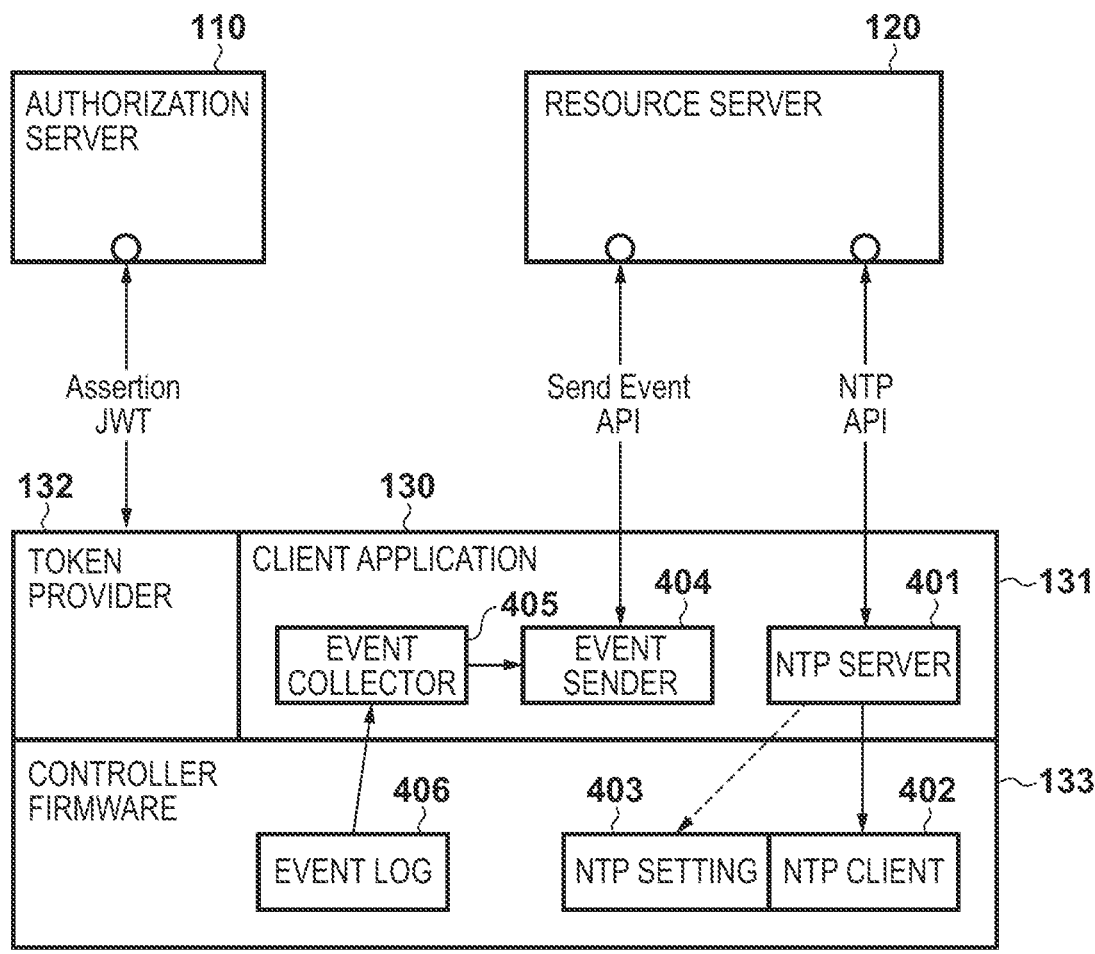
FIG. 4 is a diagram for explaining communication between software modules of apparatuses according to the present invention.

FIG. 4 is a diagram for explaining communication among the client terminal 130, the authorization server 110, and the resource server 120 according to the present embodiment. In the present embodiment, the client application 131 of the client terminal 130 is configured by including an NTP server 401, an event sender 404, and an event collector 405. The controller firmware 133 of the client terminal 130 is configured by including an NTP client 402, an NTP setting 403, and an event log 406.

The token provider 132 of the client terminal 130 according to the present embodiment makes a token request to the authorization server 110 in response to an authorization token request from the client application 131, and obtains an authorization token from the authorization server 110.

The client application 131 according to the present embodiment is an application that collects various event logs in the client terminal 130 and sends the collected event logs to the resource server 120. For example, when the client terminal 130 is an image forming apparatus, the event log includes a scan/print job event, a low toner event when the amount of toner becomes equal to or less than a predetermined value, an abnormality detection event of each unit of the apparatus, an end-of-life event of a replacement part, and the like.

The event collector 405 of the client application 131 of the client terminal 130 collects various event logs of the controller firmware 133. The event sender 404 of the client application 131 uses the authorization token obtained from the token provider 132 to periodically send the collected event log 406 of the event collector 405 to the resource server 120. The NTP server 401 of the client application 131 uses the authorization token obtained from the token provider 132 to obtain time synchronization information from the resource server 120. Further, the NTP server 401 transfers time synchronization information to the NTP client 402 of the controller firmware 133 to perform time synchronization of the client terminal 130.

Here, NTP (Network Time Protocol) is a protocol defined by RFC 5905, and is a protocol for, in a network-connected device, synchronizing the time held by the device with the correct time held by a high-level server. The NTP server 401 of the present embodiment obtains the time of an NTP server (not illustrated) inside the resource server 120 using a REST API that uses HTTP (Hypertext Transfer Protocol). Further, the NTP server 401 uses the NTP protocol to notify the NTP client 402 of the controller firmware 133.

Further, the NTP server 401 of the client application 131 according to the present embodiment has an NTP setting function for setting the IP address of the NTP server 401 itself to the NTP setting 403 of the controller firmware 133.

In the event log 406 of the controller firmware 133, a scan/print job event, a low toner event when the toner amount has become equal to or less than a predetermined value, an abnormality detection event of each part of the apparatus, an end-of-life event of a replacement part, and the like are recorded in the form of a log file. Incidentally, the format for recording an event may be a format such as a message queue. The event notification may be notified by, for example, an interrupt to the event collector 405.

The NTP client 402 of the controller firmware 133 obtains the time information of an NTP server via the network, and corrects the system clock of the client terminal 130. As a result, the time of the client terminal 130 is synchronized with the time of the NTP server. The NTP client 402 of the present embodiment obtains the time of the NTP server 401 using the internal network of the client terminal 130, and performs time synchronization.

Figure 5:
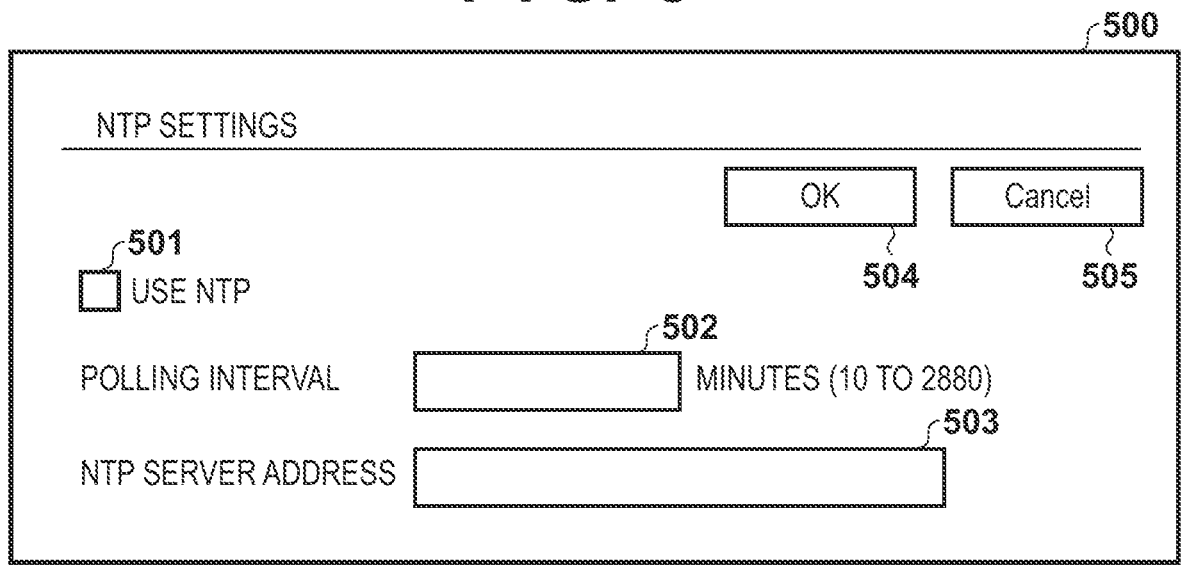
FIG. 5 is a diagram illustrating an example of a configuration of a user interface of an NTP setting screen according to the present invention.

FIG. 5 illustrates an NTP setting screen 500 of the NTP setting 403 of the controller firmware 133 according to the present embodiment. The NTP setting 403 can perform various settings of the NTP client 402 of the client terminal 130 in accordance with the NTP setting screen 500. A setting corresponding to a setting item of the NTP setting screen 500 can be made by an API call from the NTP server 401 of the client application 131.

The NTP setting screen 500 includes a check box 501, an input field 502, an input field 503, an OK button 504, and a cancel button 505. The check box 501 is a check box for setting whether to use NTP or not. The input field 502 is a field for inputting a polling interval for synchronizing the time with an NTP server. In this case, it is possible to make a designation in units of minutes. The input field 503 is a field for designating an IP address of an NTP server to synchronize with. The OK button 504 is a button for reflecting values designated on the NTP setting screen 500. The cancel button 505 is a button for discarding values designated on the NTP setting screen 500.

[Time Alignment Process]

Figure 6:
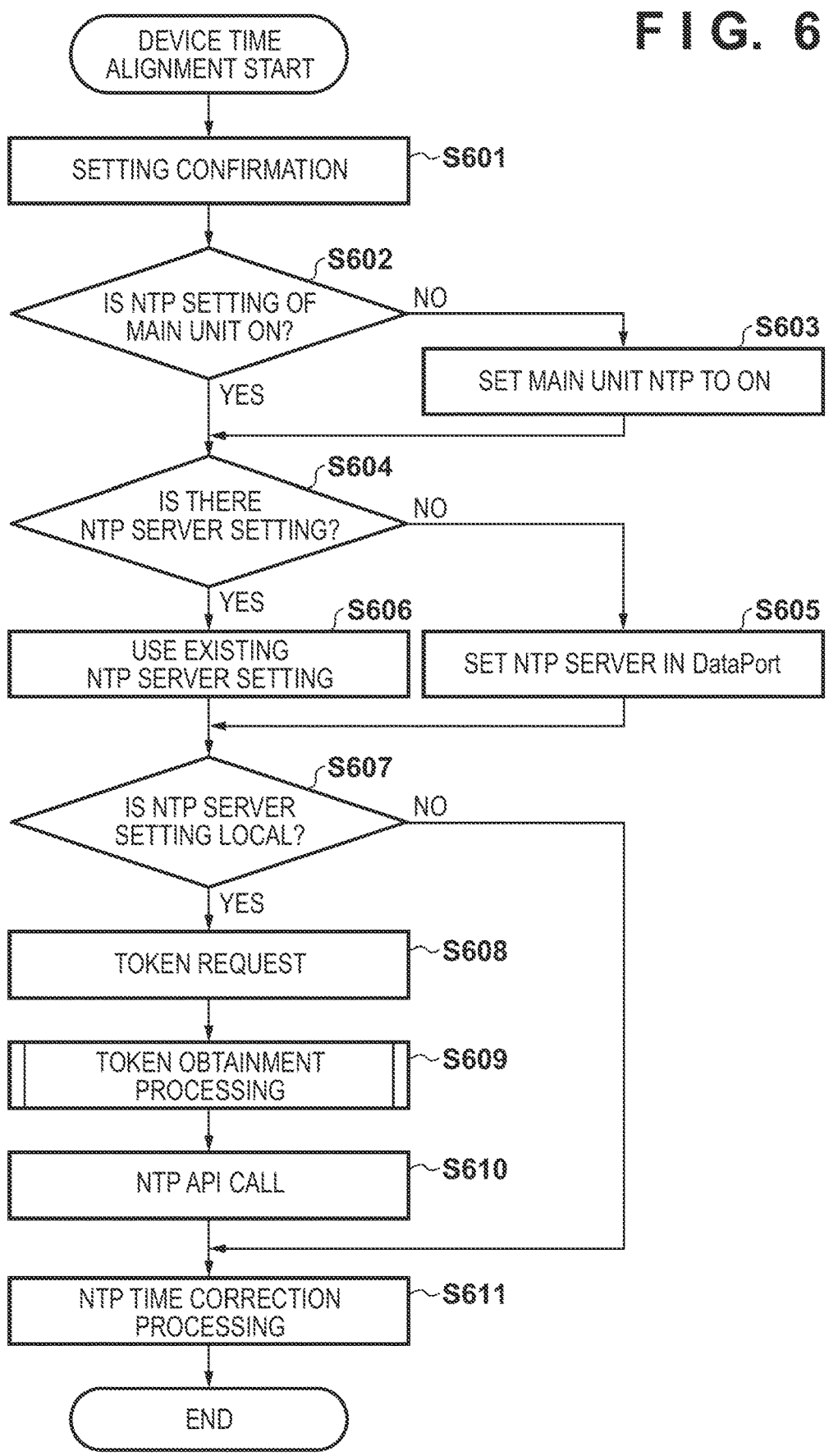
FIG. 6 is a flowchart of a time alignment process of a client device according to the present invention.

FIG. 6 is a flowchart of a client terminal time alignment process in the client terminal 130 according to the present embodiment. This processing flow is periodically executed when the client application 131 of the client terminal 130 is activated and when the NTP server time obtainment processing operation of the NTP client 402 of the controller firmware 133 of the client terminal 130 is performed. The periodic execution interval of the NTP server time obtainment processing by the NTP client 402 is in accordance with the setting corresponding to the polling interval (numerical value, unit of minutes) of the input field 502 illustrated in FIG. 5. In the present embodiment, in one client terminal 130, different time alignments are performed in two cases, that is, when the token provider 132 obtains a token and when the client application 131 performs an event log recording operation. Hereinafter, the two time alignments will be described. In the present embodiment, as an authorization sequence, description was given by assuming the method that conforms to the authentication framework of OAuth 2.0, which uses a JWT (JSON Web Token), but there is no limitation to this.

(Time Correction at Time of Obtainment of Token)

In the present embodiment, the token provider 132 of the client terminal 130 sends an authorization request to the authorization server 110 using an assertion in a JWT format (hereinafter referred to as a JWT assertion), and after the authorization request is verified by the authorization server 110, an authorization token is obtained in accordance with the verification result. In this case, as a countermeasure for a so-called replay attack such as unintentional reuse of the JWT assertion, the expiration time of the JWT assertion is set to 5 minutes. Assume that the time of the client terminal 130 is 5 minutes or more slower than the time of the authorization server 110, and the token provider 132 creates a JWT assertion using the slower time, and sends an authorization token obtainment request to the authorization server 110. In this case, the token provider 132 cannot obtain an authorization token from the authorization server 110. That is, the authorization server 110 that has received the JWT assertion of the authorization token request, for which the 5 minutes validity period has elapsed, determines that the expiration time has passed in the verification of the JWT assertion, and refuses to issue a token due to an invalid JWT assertion.

Also, assume that the time of the client terminal 130 is in the future compared to the current time at the time of the verification of the JWT assertion on the authorization server 110, and that the token provider 132 creates a JWT assertion by using that future time. Even when this JWT assertion is used to send an authorization token obtainment request to the authorization server 110, the token provider 132 is unable to obtain an authorization token from the authorization server 110. That is, the authorization server 110 that has received the JWT assertion of the authorization token request, for which the issuance time is in the future compared to the current time, determines that it is outside of the validity period in the verification of the JWT assertion, and refuses to issue a token due to an invalid JWT assertion.

As described above, when the time of the client terminal 130 is a time outside the validity period of the JWT assertion, when issuing the JWT assertion, there is a need for an immediate time correction in order for the token provider 132 to correctly set the issuance time and the expiration time of the JWT assertion.

(Time Correction for Event Log Recording)

In contrast, the event collector 405 of the client application 131 of the client terminal 130 according to the present embodiment collects various event logs of the controller firmware 133. In the various event logs, times for when events occur in the client terminal 130, for example, a job event, a low toner event when the amount of toner becomes equal to or less than a predetermined value, an abnormality detection event of each part of the apparatus, an end-of-life event of a replacement part, and the like, are recorded. The time of the client terminal 130 is used as these times. The occurrence times of this event log needs to correctly record an event occurrence order. In the present embodiment, various event logs collected by the event collector 405 of the client application 131 are periodically sent to the resource server 120. The resource server 120 of the present embodiment, which has collected various event logs of the client terminal 130, can analyze various events, for example, and order a consumable part, or predict a problem such as a malfunction. The use of the collected logs and the service provided by the resource server 120 are not limited to the above, and may be a different service.

For example, it is assumed that an event log 2 indicating that the toner amount is empty is recorded after an event log 1 indicating that the toner amount is less than or equal to an predetermined value in a low toner event of the client terminal 130. In this case, the event occurrence time is the event log 1< the event log 2 (comparison of magnitude with the future being large and the past being small). At this time, it is understood that an order for a consumable part (not illustrated) of the resource server 120 may order one target toner cartridge. In this regard, consider a case where the event occurrence time is erroneously reversed and recorded as in event log 1> event log 2. In an order for a consumable part of the resource server 120, first, the event log 2 is judged and the toner cartridge is ordered, and thereafter, the event log 1 is judged and there is a possibility that a toner cartridge which should be unnecessary is ordered again. In addition, a case in which prediction of a problem such as a malfunction (not illustrated) is performed in the resource server 120 is considered. For example, it is assumed that the location of a malfunction is specified in accordance with an event occurrence order such as: when a part B malfunctions (event B) after the malfunction (event A) of a part A, the failure cause is C. At this time, if the occurrence time of the event A and the event B are erroneously recorded in reverse, it becomes impossible to specify the failure cause C.

In order to prevent the event occurrence order from being erroneously reversed as described above, time correction means in the client terminal 130 should not immediately perform time correction without considering reversal of event occurrence times. Therefore, the client terminal 130 needs to perform time correction so as to gradually align to the correction time by repeating a correction that is less than or equal to a minimum time of an event occurrence interval. In the present embodiment, description is given on the assumption that the service provided by the resource server 120 is a service that requires sequentiality of logs with respect to time and a guarantee of the progression of time.

As described above, for a time correction when obtaining a token, there is a need to make an immediate correction for the time to be recorded in the JWT assertion of the token obtainment request. Meanwhile, for time correction when recording an event log, it is necessary for the time correction to gradually align with the corrected time by repeating correction of less than or equal to the minimum time of an event occurrence interval, in consideration of reversed event occurrence times. In the present embodiment, processing is performed in consideration of these two time correction methods.

In step S601, the client application 131 confirms the NTP settings of the client terminal 130. In the NTP settings of the client terminal 130, the values of the settable items illustrated in the NTP setting screen 500 of FIG. 5 are managed internally.

In step S602, the client application 131 obtains, out of the NTP settings, the value of a setting for whether or not to use NTP, and determines whether or not the NTP setting is on (using the NTP settings). If it is set not to use NTP (OFF) (NO in step S602), the process proceeds to S603, and if it is set to use NTP (ON) (YES in step S602), the process proceeds to S604.

In step S603, the client application 131 makes a setting to use NTP (ON), with respect to the NTP settings. That is, a setting is changed so that the time is adjusted in accordance with NTP. Then, the process proceeds to S604.

In step S604, the client application 131 confirms the setting of the NTP server address among the NTP settings, and determines whether or not the NTP server address is set. If the NTP server address is set (YES in step S604), the processing advances to step S606, and if the NTP server address is not set (NO in step S604), the processing advances to S605.

In step S605, the client application 131 sets "localhost" indicating the client terminal 130 itself, in other words "127.0.0.1" in the case of IPv4. This means that the NTP server to be used by the client terminal 130 is set to the NTP server 401 of the client application 131. Then, the process proceeds to S607.

In step S606, the client application 131 proceeds to step S607 on the assumption that the set NTP server address is used.

In step S607, the client application 131 determines whether or not the NTP server address setting of the NTP settings is "localhost" (in other words, "127.0.0.1" in the case of IPv4) indicating the client terminal 130 itself. If the setting is "localhost" indicating the client terminal 130 itself (YES in step S607), the processing proceeds to S608, otherwise (NO in step S607) the processing proceeds to S611. At this time, a case where the setting is not the client terminal 130 itself means a case where a destination for referencing time synchronization information is designated in advance as the NTP server. In the present embodiment, in this case, the time is corrected using the time information of the designated reference destination.

In step S608, the client application 131 requests the token provider 132 to obtain an authorization token (access token) for accessing the resource server 120 (authorization token request).

In step S609, upon accepting the authorization token request, the token provider 132 performs, with respect to the authorization server 110, a process of obtaining an authorization token (makes a token request) for the client application 131 to access the resource server 120. Details of this step will be described later with reference to FIG. 7 and FIG. 8. After obtaining the authorization token for the client application 131, the processing proceeds to step S610.

In step S610, the NTP server 401 of the client application 131 calls an NTP request API of the resource server 120 using the obtained authorization token. In response to this, time information of the resource server 120 is obtained. Then, the process proceeds to S611.

In step S611, the NTP client 402 of the controller firmware 133 complies with the NTP server 401 of the client application 131 to perform time correction in accordance with NTP. The specific operations of this step will be described later with reference to FIG. 9 to FIG. 11. After the NTP time correction, this processing flow ends.

[Process for Obtaining Token]

Hereinafter, the process of obtaining a token in step S609 of FIG. 6 will be described in detail with reference to FIG. 7 and FIG. 8.

(Assertion Verification Process)

Figure 7:
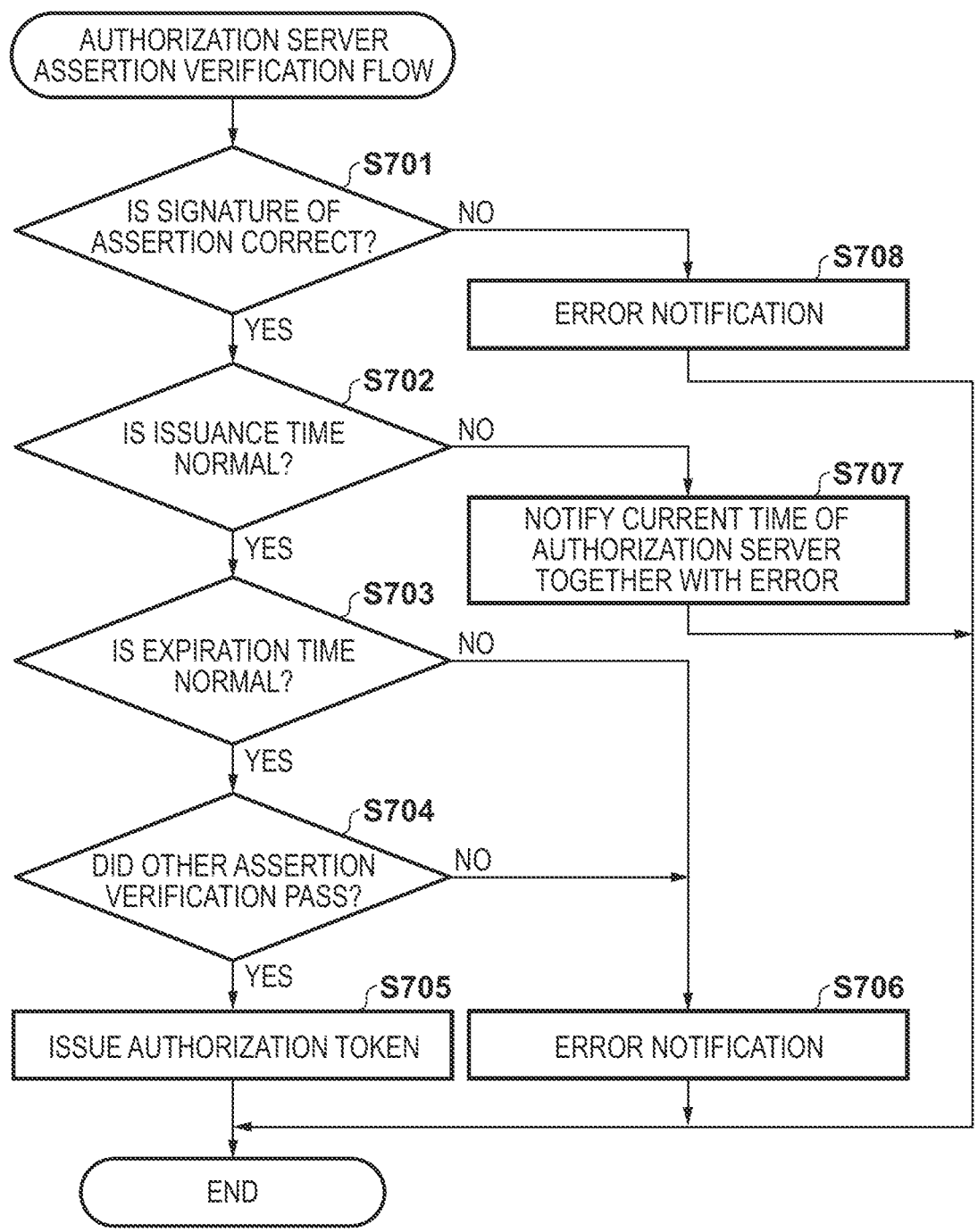
FIG. 7 is a flowchart of an assertion verification process of an authorization server according to the present invention.

FIG. 7 is a flowchart of a process of verifying an assertion in the SWT format in the authorization server 110 and issuing a token in a time correction when obtaining a token according to the present embodiment.

First, an example of the verification information included in the assertion used in the present embodiment will be described.

```
{ "iss": "aaa.inc",
"sub": "client.id",
"aud": "https://xxx.aaa/service-xxx",
"iat": 1514732400,
"exp": 1514732700
}
```

Here, there is a configuration that includes an identifier of the client terminal 130 as "iss", a user identifier as "sub", an identifier (aud) of a subject for which usage is envisioned, an issuance time (iat), and an expiration time (exp). The JWT assertion is constructed by adding header information and a signature made by the private key of the client terminal 130 to the verification information.

In step S701, the authorization server 110 verifies the signature of the assertion included in the token request received from the client terminal 130. If the signature is correct (YES in step S701), the process proceeds to step S702, and if the signature is invalid (NO in step S701), the process proceeds to step S708.

In step S702, the authorization server 110 obtains the issuance time (iat) from the verification information included in the assertion, and checks whether the issuance time falls within a normal issuance time range defined by the authorization server 110. The normal issuance time range defined here is, for example, the value t1 in the range of "current time of the authorization server 110 −5 minutes"≤ t1 ≤"current time of the authorization server 110 +5 minutes" when the deviation from the current time allowed for the issuance time is 5 minutes. If the issuance time (iat) of the verification information included in the assertion falls within the normal time range (YES in step S702), the process proceeds to step S703, and if the issuance time (iat) falls outside the range (NO in step S702), the process proceeds to step S707.

In step S703, the authorization server 110 obtains the expiration time (exp) from the verification information included in the assertion, and checks whether the expiration time falls within a normal validity period range defined by the authorization server 110. The normal validity period range defined here is determined by the authorization server 110. For example, when the assertion validity period is 5 minutes, the normal validity period range is a value t1 in the range of "current time of the authorization server 110"≤ t1 ≤"current time of the authorization server 110+5 minutes". If the expiration time included in the assertion falls within the normal period range (YES in step S703), the process proceeds to step S704, and if the expiration time falls outside the range (NO in step S703), the process proceeds to step S706.

In step S704, the authorization server 110 performs assertion verification of other information. The detail of the verification performed here is not particularly limited, and, for example, it may be verified that the identifier of the issuer included in the assertion is the client terminal 130, or it may be verified that the designated user identifier is an authorized user. As necessary, this step may be omitted. If the verification processing passed (YES in step S704), the process proceeds to step S705, and if the verification processing failed (NO in step S704), the process proceeds to step S706.

In step S705, as a response to the token request, the authorization server 110 issues an authorization token for accessing the resource server 120 to the client terminal 130. Then, this processing flow ends.

In step S706, as a response to the token request, the authorization server 110 returns an error that detail of the assertion is invalid to the client terminal 130. Then, this processing flow ends.

In step S707, the authorization server 110 determines that the clock of the client terminal 130 is not operating normally because the issuance time is not within the normal time range. As a response to the token request, the authorization server 110 returns an error that includes the current time of the authorization server 110 to the client terminal 130. Then, this processing flow ends.

In step S708, as a response to the token request, the authorization server 110 returns an error that the signature of the assertion is invalid to the client terminal 130. Then, this processing flow ends.

The definitions of the issuance time and the normal range for the validity period used in the processes of step S702 and step S703 above need not conform to those described above, and may be set on the basis of other criteria in the authorization server 110.

(Authorization Token Obtainment Process)

Figure 8:
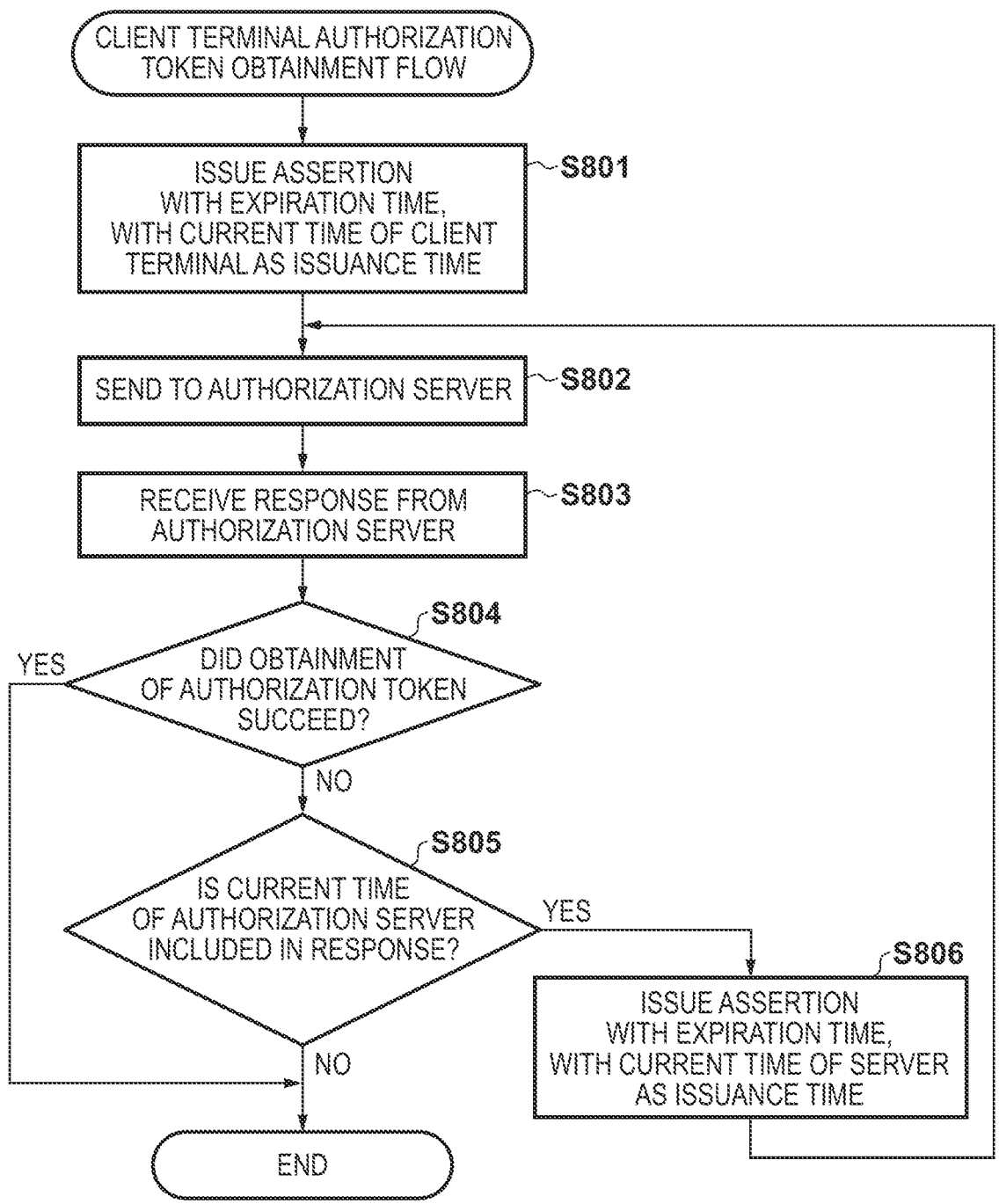
FIG. 8 is a flowchart of an authorization token obtainment process of the client terminal according to the first embodiment.

FIG. 8 is a flowchart of a process in which the client terminal 130 (the token provider 132) obtains an authorization token using a JWT assertion in time correction when obtaining a token according to the present embodiment.

In step S801, the client terminal 130 determines the issuance time (iat) and the expiration time (exp) based on the current time of the client terminal 130, and generates the verification information including the issuance time (iat) and the expiration time (exp), and information of the identifier of the client terminal 130 (iss), the user identifier (sub), and the identifier (aud) of the subject for which usage is envisioned. Then, the client terminal 130 signs the generated verification information with the private key stored in advance, and issues the signed verification information as an assertion. For example, when the issuance time is "2018.01.01 12:00:00" and the validity period is 5 minutes, the expiration time is determined to be "2018.01.01 12:05:00".

In step S802, the client terminal 130 sends the assertion issued in step S801 to the authorization server 110 to perform a token request.

In step S803, the client terminal 130 receives a response to the token request.

In step S804, the client terminal 130 determines whether obtainment of a token succeeded. If it is determined that an authorization token has been obtained (YES in step S804), the process ends. If it is determined that an authorization token was not obtained (NO in step S804), the process proceeds to step S805.

In step S805, the client terminal 130 determines whether or not the current time of the authorization server 110 is included in the response. If the current time is included (YES in step S805), the process proceeds to step S806, and if the current time is not included (NO in step S805), the process ends. Here, the case where the current time is included corresponds to the case where the authorization server 110 determines that the clock of the client terminal 130 is not operating normally, as illustrated in step S707 of FIG. 7.

In step S806, the client terminal 130 signs the expiration time and the issuance time, which is set to the current time of the authorization server 110, with the private key that is stored in advance, and issues the assertion again. That is, by reissuing the assertion using the current time of the authorization server 110, the client terminal 130 temporarily corrects the time error between the authorization server 110 and the client terminal 130. Thereafter, the processing returns to step S802, and the client terminal 130 resends the assertion issued again to the authorization server 110.

In this processing flow, the private key used for the signature is stored in advance by the client terminal 130, but there is no limitation to this. For example, the client terminal 130 may access and authenticate the authorization server 110 by a method (not illustrated), and may store and use a private key issued from the authorization server 110. Further, in step S805, if the current time is not included in the response, the process is finished, but how to handle a time when the obtainment of the authorization tokens fails is not limited to this. For example, an assertion may be corrected and an authorization token request made again in the case of an error due to another failure reason.

As described above, according to the flow of FIG. 7 and FIG. 8, even if there is an error of a predetermined range or more between the current time of the client terminal 130 side and the current time of the authorization server 110, the authorization token can be issued.

[NTP Time Correction Operation]

Next, the NTP time correction processing according to the present embodiment will be described in detail with reference to FIG. 9 to FIG. 11. This operation corresponds to the operation performed in step S611 of FIG. 6.

Figure 9:
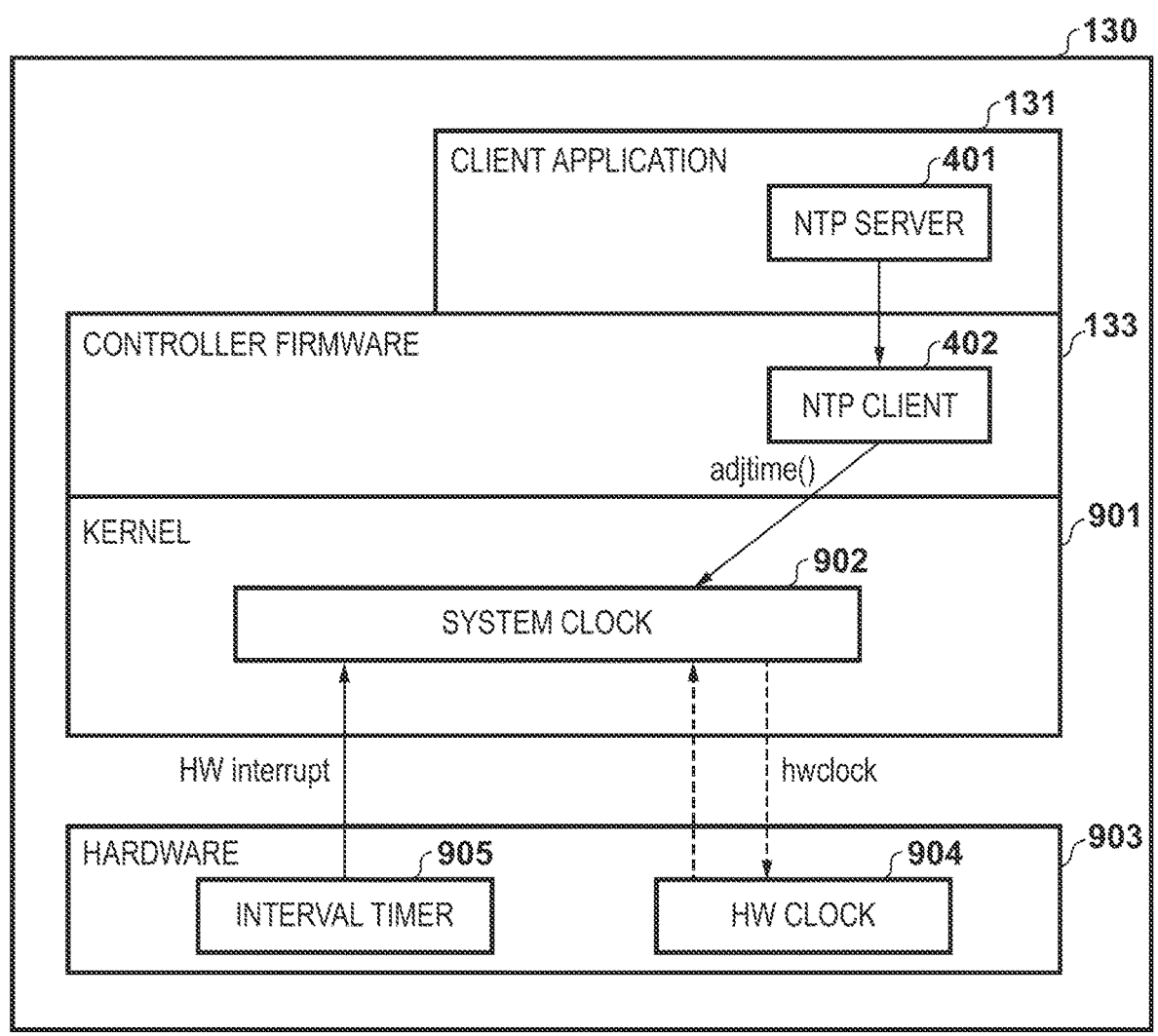
FIG. 9 is a diagram illustrating an example of a configuration of software modules of the client terminal according to the present invention.

FIG. 9 is, with respect to each module of the client terminal 130 illustrated in FIG. 4, a diagram illustrating modules relating to the NTP time correction processing in further detail. In FIG. 9, the client terminal 130, the client application 131, the controller firmware 133, the NTP server 401, and the NTP client 402 are similar to the modules illustrated in FIG. 4.

The controller firmware 133 of the client terminal 130 according to the present embodiment operates on the kernel 901 of an OS such as Linux (registered trademark). The kernel 901 has a system clock 902. The system clock 902 is a clock inside the kernel 901, and increments the time in accordance with an interrupt of an interval timer. When the client terminal 130 is activated, the system clock 902 refers to a hardware clock (for example, a CMOS clock) mounted on the hardware 903 which represents a motherboard base, and sets the system clock 902. During the operation of the client terminal 130, the time of the client terminal 130 is incremented by updating the system clock 902 in accordance with periodic interruption of the interval timer 905 mounted on the hardware 903. Basically, it is the value of the system clock 902 of the kernel 901 that the controller firmware 133 or the client application 131 obtains and uses as the time of the client terminal 130.

The NTP time correction processing according to the present embodiment is periodically executed by the NTP client 402. The NTP client 402 periodically obtains the set NTP server time from the NTP server 401 in accordance with the polling interval (corresponding to the setting of the input field 502 illustrated in FIG. 5). The NTP client 402 periodically corrects the value of the system clock 902 stored in the memory of the kernel 901 in accordance with a system call that uses adjtimex( ) in accordance with the received time of the NTP server 401.

(Case of Correcting Slow System Clock)

Figure 10:
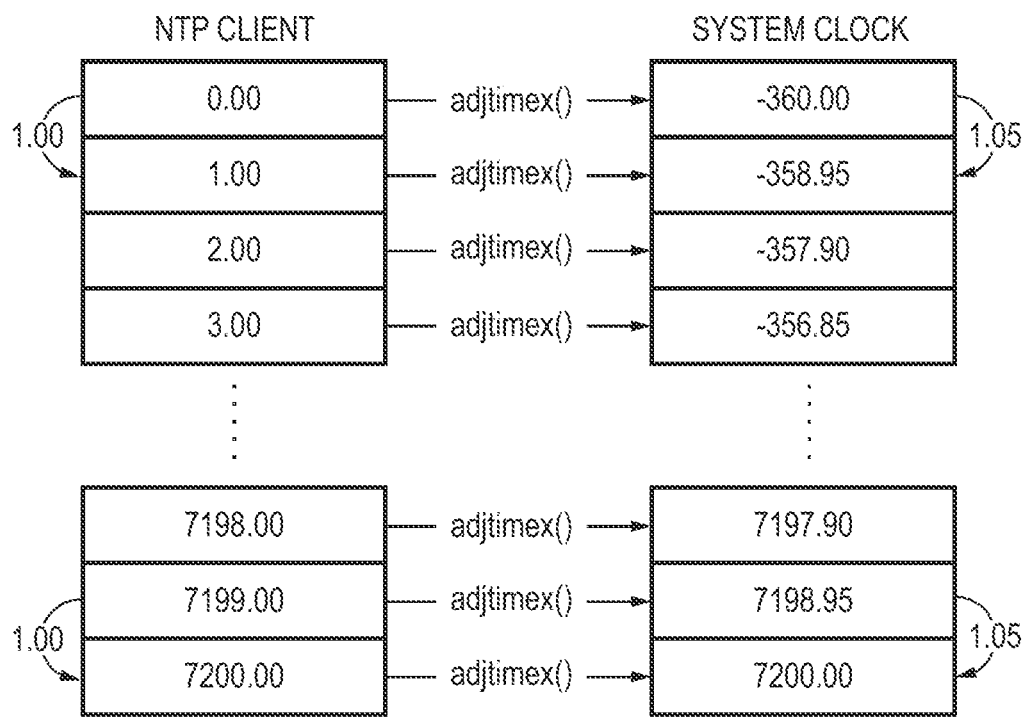
FIG. 10 is a diagram for explaining a correction operation in a case where a system clock is slow.

FIG. 10 is a diagram for explaining a correction operation in which the NTP client 402 corrects the system clock 902 when the time indicated by the system clock 902 is slower than the time of the NTP server 401.

The NTP client 402 obtains a parameter corresponding to the time "2018-08-29 08:56:25" from the NTP server 401. At this time, if the time of the system clock 902 is "2018-08-29 08:50:25", the system clock 902 is slower by 6 minutes than the time of the NTP server 401. When this is corrected, the NTP client 402 corrects the system clock 902 by +0.05 sec every second in accordance with an adjtimex( ) system call every second. By repeating this operation 7200 times, the time can be adjusted by gradually eliminating the initial difference of 6 minutes after 7200 seconds.

(Case of Correcting Fast System Clock)

Figure 11:
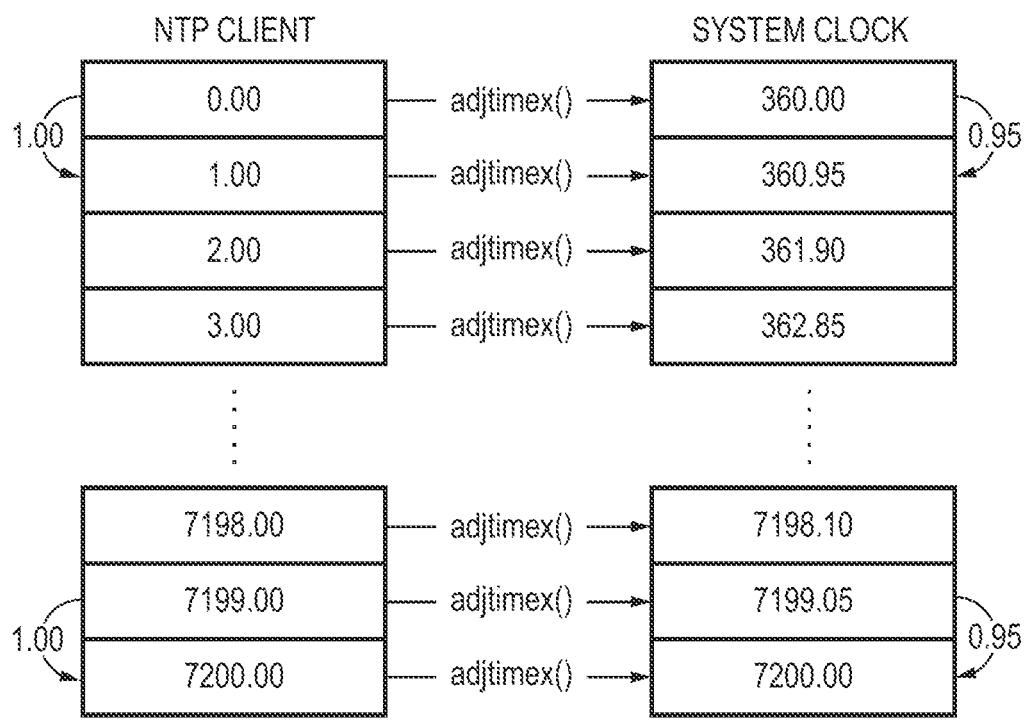
FIG. 11 is a diagram for explaining a correction operation in a case where a system clock is fast.

FIG. 11 is a diagram for explaining a correction operation in which the NTP client 402 corrects the system clock 902 when the time indicated by the system clock 902 is later than the time of the NTP server 401.

The NTP client 402 obtains a parameter corresponding to the time "2018-08-29 08:56:25" from the NTP server 401. At this time, if the time of the system clock 902 is "2018-08-29 09:02:25", the system clock 902 is faster by 6 minutes than the time of the NTP server 401. When this is corrected, the NTP client 402 corrects the system clock 902 by −0.05 sec every second in accordance with an adjtimex( ) system call every second. By repeating this operation 7200 times, the time can be adjusted by gradually eliminating the initial difference of 6 minutes after 7200 seconds.

As described with reference to FIG. 10 and FIG. 11, the time is gradually corrected. As a result, when the interval between various events recorded in the event log 406 of the controller firmware 133 is 0.05 seconds or less, various events can be recorded without reversing the order of event occurrence times.

Therefore, by virtue of the present embodiment, when two different time corrections are required, it is possible to perform time alignment safely and reliably.

Second Embodiment

A second embodiment of the present invention will be explained. In the present embodiment, description is given for a mode in which the method of time correction when obtaining a token is different from that of the first embodiment. Description of configurations that overlap with those of the first embodiment is omitted. In the present embodiment, it is assumed that the client terminal 130 stores a counter for obtaining a count from the time of starting a clock or a client.

[Processing Flow]

(Authorization Token Obtainment Process)

Figure 12:
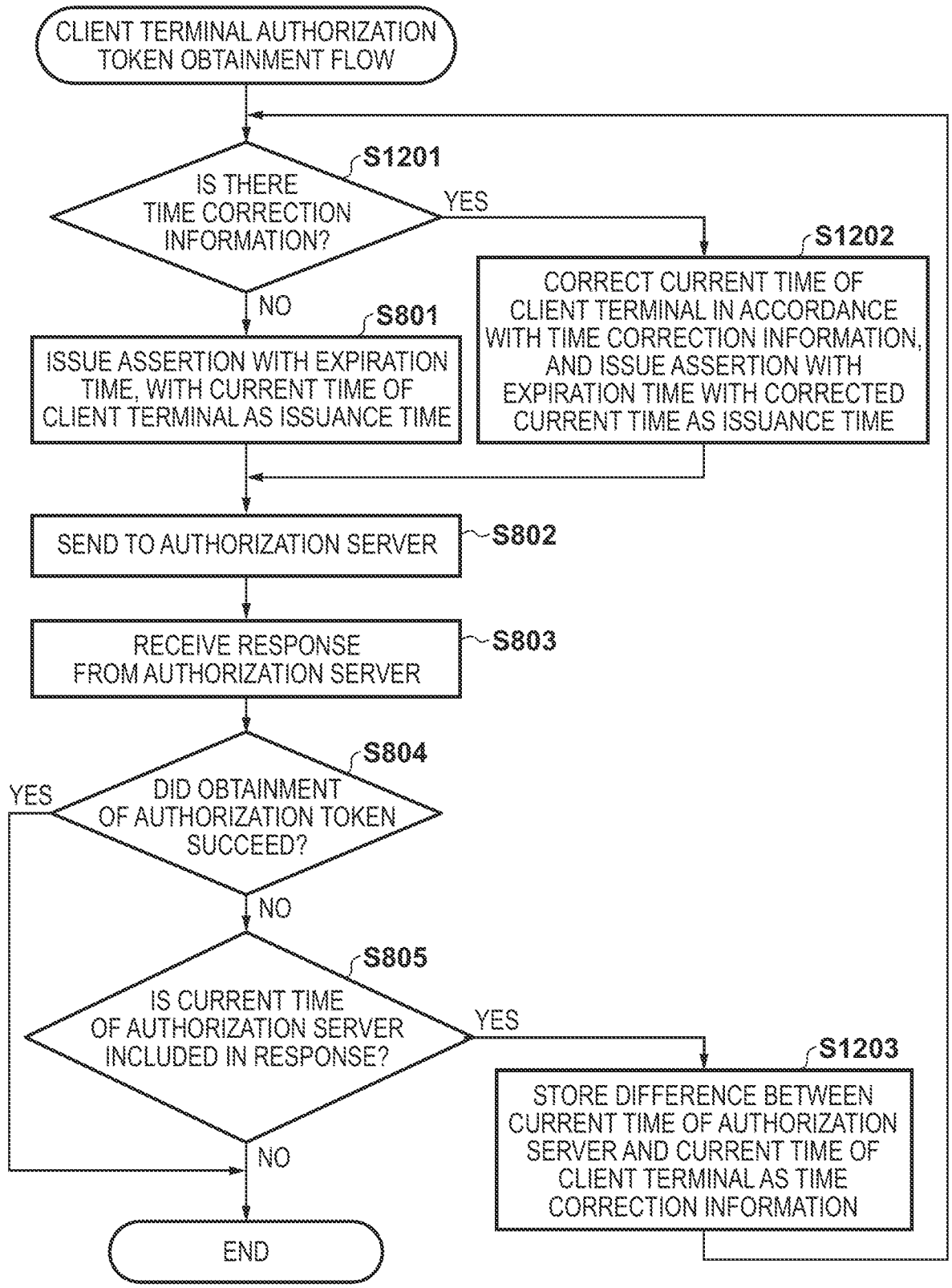
FIG. 12 is a flowchart of an authorization token obtainment process of a client terminal according to a second embodiment.

FIG. 12 is a flowchart of an authorization token obtainment process performed by the client terminal 130 using a JWT assertion in an embodiment of time correction when obtaining a token according to the present embodiment. It is executed instead of FIG. 8 of the first embodiment, and the same processes as those of FIG. 8 are denoted by the same reference numerals.

In step S1201, the client terminal 130 checks whether the time correction information is stored. The time correction information is a value that records the difference between the times of the authorization server 110 and the client terminal 130. This value is not stored initially, and is stored by the processing being repeated. When it is determined that time correction information is stored (YES in step S1201), the processing proceeds to step S1202, and when it is determined that time correction information is not stored (NO in step S1201), the processing proceeds to step S801.

In step S1202, the client terminal 130 determines the issuance time (iat) and the expiration time (exp) based on the current time obtained by correcting the current time of the client terminal 130 with the time correction information. Then, the client terminal 130 generates verification information that includes the issuance time (iat) and the expiration time (exp), the identifier (iss) of the client terminal 130 itself, the user identifier (sub), and the identifier (and) of a subject for which usage of the client terminal 130 is envisioned. Then, the client terminal 130 signs the generated verification information with the private key stored in advance, and issues the signed verification information as an assertion.

Table 1 below is an example of a time correction table for managing correction time information according to the present embodiment.

TABLE 1

| Time correction table |
|---|
| Correction time information |
| +32400 seconds |

For example, it is assumed that the current time of the client terminal 130 is "2018.01.01 12:00:00", and the correction time information stored in the time correction table is "+32400 seconds" (corresponding to 9 hours). In this case, the time after correction becomes "2018.01.01 21:00:00" after 9 hours. This makes it possible to correct the time lag with respect to the authorization server 110. Then, the processing proceeds to step S802.

If it is determined in step S805 that the current time of the authorization server 110 is included in the response (YES in step S805), the process proceeds to step S1203. In step S1203, the client terminal 130 stores the difference between the current time of the authorization server 110 indicated by the response obtained in step S803 and the current time of the client terminal 130 in the time correction table as the time correction information. For example, it is assumed that the current time of the client terminal 130 is "2018.01.01 1:00:00", and the current time of the authorization server 110 is "2018.01.01 10:00:00". In this case, the difference is calculated, and the time correction information "+32400 seconds" is stored in the time correction table. Then, the processing returns to step S1201.

Another Configuration Example According to the Present Embodiment

In the above-described examples of the present embodiment, it is assumed that the client terminal 130 has a clock, but even in a terminal that does not have a clock, it is possible to perform a correction in a similar manner by performing processing using the counter value of the client terminal as a UNIX time. Table 2 below illustrates an example of a configuration of a time correction table in the case of performing time correction by the counter value.

TABLE 2

| Time correction table (counter value) | |
|---|---|
| Counter start time of client terminal | Time correction information |
| 1970.01.01 00:00:00 | +1514768370 seconds |

For example, when the counter value of the client terminal 130 is "30", the current time is calculated from a count start time "1970.01.01 00:00:00" and treated as "1970.01.01 0:00:30". Then, the time correction information "+1514768370 seconds" can be obtained from the difference between the current time "2018.01.01 10:00:00" of the authorization server 110 and the correction time of the client terminal 130.

Therefore, by virtue of the present embodiment, when two different time corrections are required, it is possible to perform time alignment safely and reliably.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-218488, filed Nov. 21, 2018, which is hereby incorporated by reference herein in its entirety.

What is claimed is:

1. An information processing apparatus communicably connected to an authorization server and a resource server, the apparatus comprising:
   a requesting unit configured to send, to the authorization server, a request for a token for usage of a service provided by the resource server, wherein the request includes an expiration time generated based on a time of the information processing apparatus or time information received from the authorization server;
   an obtaining unit configured to obtain time information of the resource server via a Network Time Protocol (NTP) server using the token obtained as a response to the request; and
   a correction unit configured to correct the time of the information processing apparatus based on the time information of the resource server,
   wherein the correction unit is configured to repeatedly correct the time of the information processing apparatus, within a predetermined time duration and for a plurality of times, to reduce a time difference between the time of the information processing apparatus and the time information of the resource server.

2. The information processing apparatus according to claim 1, wherein the time information of the authorization server received as a response to the request by the requesting unit is not used as information for correcting the time of the information processing apparatus.

3. The information processing apparatus according to claim 1, further comprising:
   a setting unit configured to accept a setting related to time correction,
   wherein, when a setting to not perform a time correction is designated, in a case of using the service provided by the resource server, the setting unit changes to a setting for performing a time correction.

4. The information processing apparatus according to claim 1, wherein the service provided by the resource server includes collection of logs recorded in association with time in the information processing apparatus.

5. The information processing apparatus according to claim 4, wherein the predetermined time duration is based on a time interval between events that the information processing apparatus records in an event log.

6. The information processing apparatus according to claim 1, wherein the NTP server is implemented in the information processing apparatus.

7. A system in which an information processing apparatus, an authorization server, and a resource server are communicably connected, wherein
   the information processing apparatus comprises:
   a requesting unit configured to send, to the authorization server, a request for a token for usage of a service provided by the resource server, wherein the request includes an expiration time generated based on a time of the information processing apparatus or time information received from the authorization server;

an obtaining unit configured to obtain time information of the resource server via a Network Time Protocol (NTP) server using the token obtained as a response to the request; and a correction unit configured to correct the time of the information processing apparatus based on the time information of the resource server, wherein the correction unit is configured to repeatedly correct the time of the information processing apparatus, within a predetermined time duration and for a plurality of times, to reduce a time difference between the time of the information processing apparatus and the time information of the resource server, and the authorization server comprises:

a verification unit configured to, when a request for a token for using the service provided by the resource server is accepted from the information processing apparatus, verify the request; and an issuing unit configured to issue the token according to a result of verification by the verification unit, wherein, when it is determined by the verification unit that a setting of the expiration time of the request included in the request is not included in a range defined based on a time of the authorization server, the issuing unit sends time information of the authorization server to the information processing apparatus.

8. A non-transitory computer-readable medium storing a program for causing a computer to function as:

a requesting unit configured to send, to an authorization server, a request for a token for usage of a service provided by a resource server, wherein the request includes an expiration time generated based on a time of the computer or time information received from the authorization server;

an obtaining unit configured to obtain time information of the resource server via a Network Time Protocol (NTP) server using the token obtained as a response to the request; and a correction unit configured to correct the time of the computer based on the time information of the resource server, wherein the correction unit is configured to repeatedly correct the time of the computer, within a predetermined time duration and for a plurality of times, to reduce a time difference between the time of the computer and the time information of the resource server.

* * * * *